Patented Jan. 6, 1953

2,624,500

UNITED STATES PATENT OFFICE 2,624,500

MANUFACTURE OF FREE-FLOWING CRYSTALLINE SOLIDS

Homer D. Merrill and Conrad J. Gaiser, Berkeley, Calif., assignors to The Reaction Products Company, a corporation of California No Drawing. Application May 11, 1950, Serial No. 161,490

2 Claims. (Cl. 226—19)

This invention relates to the manufacture of finely divided, free-flowing crystalline solids, more particularly inorganic salts such as sodium chloride, magnesium sulfate, ammonium sulfate, copper sulfate and the like. These are widely used in many industrial and agricultural applications wherein the solids are dissolved in water. To facilitate this, it is desirable that the material be free-flowing and dissolve rapidly. Copper sulfate, for example, usually occurs as either of two different hydrates, the monohydrate and the penta-hydrate. We have found that crystalline copper sulfate penta-hydrate, $CuSO_4.5H_2O$, can be maintained in finely divided form and free-flowing if there be present just enough water to wet the crystal surfaces. For example, a copper sulfate mass of such size that it would all pass a 20 mesh screen and was yet retained upon a 30 mesh screen, was wet with 3%–4% by weight of water. The material remained finely divided and free-flowing, even when a lot of it was packed in a waterproof container and then stored under pressure. Similarly, water was added to separate masses of crystals of sodium chloride, magnesium sulfate and ammonium sulfate to provide a "just wet" appearance to the crystal surfaces. The materials remained free-flowing and did not cake.

The quantity of water added should be just sufficient to wet the crystal surfaces so that these appear to be wet. The quantity added will depend upon the fineness and subdivision of the crystals, the finer the crystals, the greater is the surface area to be wetted, the more water being required to wet the greater surface area. The exact quantity to be added can be readily determined for any given crystal mixture by wetting separate masses of the crystal mixture with known amounts of water and observing the action of these subsequently under pressure. From about 1½% to 8% by weight of water is generally required, the optimum can be readily determined for any given material, depending on the crystal size of the material and the surface area to be wetted. Our investigations lead us to the conclusions that caking of crystalline solids is caused by migration of small amounts of water present. This migration of water causes adjacent crystalline faces to join due to their partial solution and subsequent recrystallization of dissolved material between the two crystal faces. This caking becomes most pronounced when two hydrates of the material are possible, as in the case of copper sulfate, for in this case, it is possible for a greater quantity of water to migrate and in changing from one hydrate to another there is a change in the nature of the crystals as well as solution and recrystallization of the material. In the case of every material tested, there was marked improvement in flowing characteristics and complete freedom from caking when the proper amount of water was added. Being initially wet with water, the material wets immediately when placed in a dissolving tank.

The copper sulfate penta-hydrate can be produced by any desired process, care being taken to ensure that the monohydrate is absent for this is not free-flowing; in fact, the presence of water on the crystals of the penta-hydrate apparently ensures the continued absence of the monohydrate whereby the penta-hydrate remains free-flowing. The penta-hydrate crystals are ground to any desired size, wet with the requisite quantity of water and finally packaged in a suitable water-tight container. In general, the quantity of water added will be between about 2% and about 5% by weight of the copper sulfate penta-hydrate.

To illustrate the practice of the invention with other solids, each of the following materials was wet with water sufficient to provide the defined "just-wet" condition wherein they remain free-flowing and non-caking. The solids were finely divided and when not "just-wet," that is, when nominally dry, caked undesirably.

| Substance | Percent Water added on Initial Dry Weight of Substance |
|---|---|
| NaCl | 7.3 |
| NaCl | 2.5 |
| $(NH_4)_2SO_4$ | 2.8 |
| $(NH_4)_2SO_4$ | 4.5 |
| $MgSO_4.7H_2O$ | 3.7 |
| $MgSO_4.7H_2O$ | 2.2 |

Each material was then packaged in a waterproof, moistureproof bag of such nature that the contents could be visually inspected. The filled bags were sealed and placed under a heavy, compressive load to simulate an adverse storage condition. At the same time, similar bags were filled with the same materials in their nominally dry condition. The several bags were observed over three weeks storage during which the nominally dry materials caked and hardened into solid masses while those which contained the added moisture remained free-flowing and finely divided.

We claim:

1. The method of packaging finely divided copper sulfate penta-hydrate to maintain it in such finely divided form and free-flowing comprising applying from about two to about five per cent by weight of free water uniformly to the surface of finely divided copper sulfate penta-hydrate and placing the thus wet material in a waterproof and vapor-proof container.

2. The method of claim 1 wherein copper sulfate penta-hydrate is of a size between 20 and 30 mesh and from about 3% to 4% by weight of water is added.

HOMER D. MERRILL.
CONRAD J. GAISER.

REFERENCES CITED

The following references are of record in the file of this patent:

UNITED STATES PATENTS

| Number | Name | Date |
|---|---|---|
| 462,730 | Ongley | Nov. 10, 1891 |
| 2,174,450 | Segura | Sept. 26, 1939 |
| 2,299,999 | Lippman | Oct. 27, 1942 |
| 2,424,615 | Hempel | July 29, 1947 |

OTHER REFERENCES

J. W. Mellor, "Inorganic and Theoretical Chemistry," vol. 2, pages 552, 553; vol. 3, pages 234, 235; vol. 4, page 331; vol. 7, page 569, 14th line down, Longmans, Green & Co., N. Y.

Moss, Schilb, and Warning, "Tricalcium Phosphate as a Caking Inhibitor in Salt and Sugar," pages 142, 143, Ind. and Eng. Chem., Feb. 1933 (vol. 25, No. 2).